United States Patent [19]

Suarez-Gonzalez

[11] Patent Number: 4,666,297
[45] Date of Patent: May 19, 1987

[54] DUAL SPECTRA OPTICAL PYROMETER HAVING AN AIR PRESSURE SENSITIVE SHUTTER

[75] Inventor: Ernesto Suarez-Gonzalez, Tesquesta, Fla.

[73] Assignee: United Technologies Corporation, Hartford, Conn.

[21] Appl. No.: 798,218

[22] Filed: Nov. 14, 1985

[51] Int. Cl.⁴ .............................................. G01J 5/60
[52] U.S. Cl. ....................................... 356/45; 356/43; 374/127; 350/586
[58] Field of Search ............................ 356/43, 44, 45; 374/120, 121, 127; 350/582, 586, 587, 589

[56] References Cited

U.S. PATENT DOCUMENTS

| | | | |
|---|---|---|---|
| 4,222,663 | 9/1980 | Gebhart et al. | 356/45 |
| 4,306,835 | 12/1981 | Hurley | 356/43 X |
| 4,326,798 | 4/1982 | Kahn | 356/43 X |
| 4,614,050 | 9/1986 | Stevens | 350/586 X |

OTHER PUBLICATIONS

T. G. R. Beynon, "Radiation Thermometry Applied to the Development and Control of Gas Turbine Engines", *American Institute of Physics*, 1982, pp. 471–477.
W. H. Atkinson, R. R. Strange, "Pyrometer Temperature Measurements in the Presence of Reflected Radiation", *Proceedings of the Conference of the American Society of Mechanical Engineers*, Aug. 1976, pp. 1–8.

Primary Examiner—Eugene R. Laroche
Assistant Examiner—Robert J. Pascal
Attorney, Agent, or Firm—J. Kevin Grogan

[57] ABSTRACT

A dual spectra optical pyrometer having an air pressure sensitive shutter for measuring the temperature of a turbine blade includes a sight tube located in the jet engine receiving an optical beam from the turbine blade. Located within the sight tube is a shutter responsive to the jet engine air pressure and providing the turbine blade optical beam only above a selected threshold magnitude of said air pressure. A detection module receives and divides the turbine blade optical beam and provides signals to a signal processor. From these signals and signals indicative of an estimated fireball equivalent black body temperature and the spectral width difference between the two detector signals, the signal processor provides a signal indicative of a compensated turbine blade temperature.

6 Claims, 3 Drawing Figures

4,666,297

DUAL SPECTRA OPTICAL PYROMETER HAVING AN AIR PRESSURE SENSITIVE SHUTTER

DESCRIPTION

1. Technical Field

This invention relates to optical pyrometers and more particularly to dual spectra optical pyrometers having an air pressure sensitive shutter.

2. Background Art

Dual spectra optical pyrometers are well known and have been used to measure the temperature of turbine blades in an operating jet engine. The discrimination needed between the optical energy emitted by the blade and the reflected energy of a combustion flame is provided by utilizing two spectral bands in the pyrometer.

In the dual spectra optical pyrometer disclosed by Gebhart et al in U.S. Pat. No. 4,222,663, light from a target turbine blade is provided to two pyrometers having different spectral bands whose outputs are subsequently processed to provide an estimate of the magnitude of the reflected energy and which provides a corrected temperature signal therefrom.

Typically the optical beam from a rotating turbine blade is received by a sight tube located in the engine housing. Contained therein is a lens plus other optical elements that gather the turbine blade optical beam and provide it to a optical fiber bundle. In addition, a high pressure gas is provided in the sight tube to both purge the sight tube of contaminants and cool the optical components. The high temperatures and pressures of the jet engine interior render the pyrometer sight tube environment quite hostile.

For proper operation the optical components require that the sight tube interior remain free from debris which would otherwise interfere with reception of the target optical beam. In the prior art purge gas is only supplied during engine operation. Debris accumulates in the sight tube while engine is not operating.

The purge gas does not completely eliminate the comtaminants that eventually obscure the turbine blade targets. Continuous exposure to the internal engine environment results in a buildup of debris and a degradation of the optical components in the sight tube as a function of time.

DISCLOSURE OF INVENTION

An object of the present invention is to provide an air pressure sensitive shutter for use in sealing optical components of an optical pyrometer.

According to the present invention, an air pressure sensitive shutter for use in sealing optical components of an optical pyrometer in a jet engine includes a sight tube located in the jet engine that has an inner bore with the inner bore adapted to receive an optical beam from a turbine blade of the jet engine. The sight tube positions the optical components in its inner bore and is responsive to the air pressure generated within the jet engine. Also included is a shutter that is positioned in the sight tube. The shutter is responsive to the jet engine air pressure and provides the turbine blade optical beam to the optical components in the sight tube only above a selected threshold magnitude of the air pressure.

According to another aspect of the present invention, a dual spectra optical pyrometer having an air pressure sensitive shutter for measuring the temperature of a remote turbine blade in a jet engine includes a sight tube having an inner bore located in the jet engine gathering from the turbine blade an optical beam having a spectral width and having an emitted component from the turbine blade and reflected component from a fireball that has an equivalent black body temperature. The sight tube is responsive to air pressure generated within the jet engine and positions an optical guide therein. A shutter that is responsive to the jet engine air pressure is positioned in the sight tube and provides the turbine blade optical beam to the optical guide only above a threshold magnitude of the air pressure. An optical detector module receives the turbine blade optical beam from the optical guide. The detection module divides the turbine blade optical beam and provides first electrical signals equivalent of a first optical component that has a spectral width selected to be a portion of the turbine blade optical beam. The optical detection module also provides second electrical signals equivalent of a second optical beam. Also included is a signal processor which receives the first and second electrical signals, as well as signals indicative of the magnitude of first optical component spectral width and an estimate of the fireball equivalent black body temperature. A signal processor generates from the first photodetector signal a linearized temperature signal indicative of an equivalent black body temperature, as well as generating from a second photodetector signal a linearized temperature signal indicative of an equivalent black body temperature. Moreover, the signal processor generates from the first and second linearized temperature signals a temperature correction signal in dependence on the estimated fireball equivalent black body temperature and the first optical component spectral width and provides a compensated temperature signal from the difference therebetween.

BEST MODE FOR CARRYING OUT THE INVENTION

Figure 1:
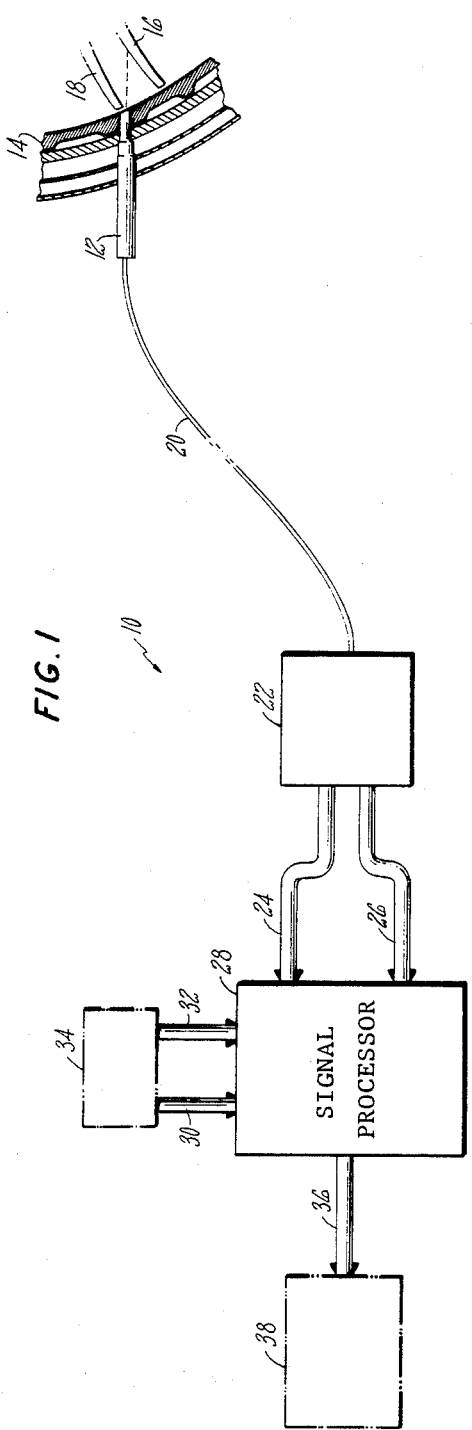
FIG. 1 is an illustration of a simplified block diagram of a dual spectra optical pyrometer having an air pressure sensitive shutter provided according to the present invention.

Referring first to FIG. 1, in an illustration of a simplified block diagram of a dual spectra optical pyrometer having an air pressure sensitive shutter provided according to the present invention, a dual spectra optical pyrometer 10 includes probe 12 mounted in casing 14 of a jet engine. The probe should be positioned to optically view a target such as rotating turbine blades 16 and 18.

In an operating jet engine the blades of the turbine reach an elevated temperature. As such they emit radiation, the intensity and spectral distribution of which is a function of temperature and can usually be estimated by the well known "black body" approximation or "grey body" approximation if some emissivity compensation is introduced. In addition, radiation (light) from the jet engine fireball is reflected off the turbine blade and also comprises part of the turbine blade optical beam. The temperature of the combustion flame or fireball is substantially higher than that of the turbine blade, and as a result, the sum of the two light or radiation beams produces a spectral energy distribution which yields an equivalent black body temperature much higher than the actual temperature of the turbine blade. The light from the target turbine blade has a spectral width and comprises a turbine blade optical beam.

The probe is positioned in the jet engine housing and receives the turbine blade optical beam. As detailed hereinafter with respect to FIG. 2, the probe comprises a sight tube having conventional light gathering optics positioned in an inner bore such that the turbine blade optical beam is received, focused and provided to an optical fiber in low temperature environments. Those skilled in the art will note that, for high temperature applications, a sapphire rod or fused fiber optic bundle may be inserted prior to the fiber optic cable. An air pressure sensitive shutter is positioned in the sight tube so as to seal the optical components from the engine environment when the ambient air pressure is below a selected threshold magnitude, thereby reducing the amount of contamination input to the sensitive optics.

The probe also has an optical guide 20, typically a fused fiber optic bundle or conventional fiber optic cable of a wide band quartz or fused silica type, which provides the turbine blade optical beam to detection module 22. The detection module is also conventional, and divides the turbine blade optical beam in two, such that a first photodetector absorbs from the turbine blade optical beam a first component thereof having a spectral width selected to be a portion of the turbine blade optical beam. In the best mode embodiment the detection module comprises a bifurcated optical fiber bundle with a conventional optical filter inserted into one of the two optical beams exiting therefrom. A second photodetector receives the remaining optical beam from the bifurcated optical fiber bundle.

The first photodetector provides signals on lines 24 which are indicative of the received energy of first component beam and comprises a first (unfiltered) signal channel whose spectral band corresponds to that of first component beam. Similarly, the second photodetector comprises a second (filtered) signal channel whose spectral band is that of the second optical beam, and provides signals on lines 26 indicative thereof.

These signals are received by signal processor 28 which is of a type known in the art and in the best mode embodiment includes appropriate conventional analog electrical circuits. In addition, the signal processor receives signals on lines 30 and lines 32 from external processing apparatus 34 not shown and not part of the present invention that are indicative of the spectral range of the first photodetector signals and an estimate of the equivalent black body temperature of the fireball.

The signals from the first photodetector are linearized by the signal processor to provide a signal indicative of an equivalent black body temperature for the first channel. The signal processor performs the same linearization to the second photodetector signals, yielding signals indicative of an effective black body temperature for the second channel.

The presence of the reflected energy results in a temperature reading in the first channel or unfiltered pyrometer which is greater than the true blade temperature. The second channel or filtered pyrometer will indicate an even higher temperature because the spectral range of the second pyrometer is limited to shorter wavelengths by the optical filter.

The signal processor computes temperature correction signals ($T_c$) and provides compensated temperature signals ($T_t$) on lines 36 to external signal processor 38 (not part of the present invention) by relating the temperature correction signals to the unfiltered temperature signals such that $$T_t = T_u - T_c \qquad (1)$$

In order to accurately compute temperature correction signals, the signal processor must receive (1) the linearized temperature signals, (2) signals indicative of the spectral width of the filter pyrometer, and (3) signals indicative of an estimate of the temperature of the fireball. In addition, temperature correction signals are a function of the percent of reflected energy in the target optical beam, a parameter often expressed as the difference between the linearized filtered temperature ($T_f$) and the linearized unfiltered temperature ($T_u$) or ($T_f - T_u$).

As is well known in the art, the percent reflected energy in the target beam can vary approximately from 0 to 50% before rendering the pyrometer inoperative, given only an estimate of the equivalent black body temperature of the fireball. As a result, there is a functional relationship between the magnitude of the temperature correction ($T_c$) signal and the percent of reflected energy ($T_f - T_u$), for a given linearized, unfiltered temperature signal magnitude.

With only an estimated fireball or combustion flame equivalent black body temperature, the error in the temperture correction signal is small when the percent reflected energy is less than 50%. For example, given an estimated equivalent black body fireball temperature of 4500° F. and a 50% reflected energy component, the magnitude of error is less than approximately 30° F., even though the estimated fireball temperature can be off by 300° F. Continuing with the example, if the percent reflected energy is less than 50%, the family of curves ($T_c$ v. ($T_f - T_u$)) resulting from multiple values of unfiltered temperature can be approximated by a single equation using conventional curve fitting techniques, yielding $$T_t = T_u - [(0.3 T_u - 150/(3500 - T_u)](T_f - T_u)^{1.28} \qquad (2)$$

where, as above, $T_t$ is the compensated temperature, $T_u$ is the unfiltered temperature, $T_f$ is the filtered temperature. Those skilled in the art will note that other empirically derived equations can be obtained for other fireball temperatures.

Moreover, it is also apparent to those skilled in the art that alternative algorithms employing either analog or digital means can be substituted. Specifically, a digital embodiment of the signal processor includes a high speed computer with conventional computer memory and analog-to-digital converters which generate and store in memory temperature correction signals similar to those described hereinabove in conventional look-up table format, with compensated temperature signals obtainable therefrom by conventional techniques.

Figure 2:
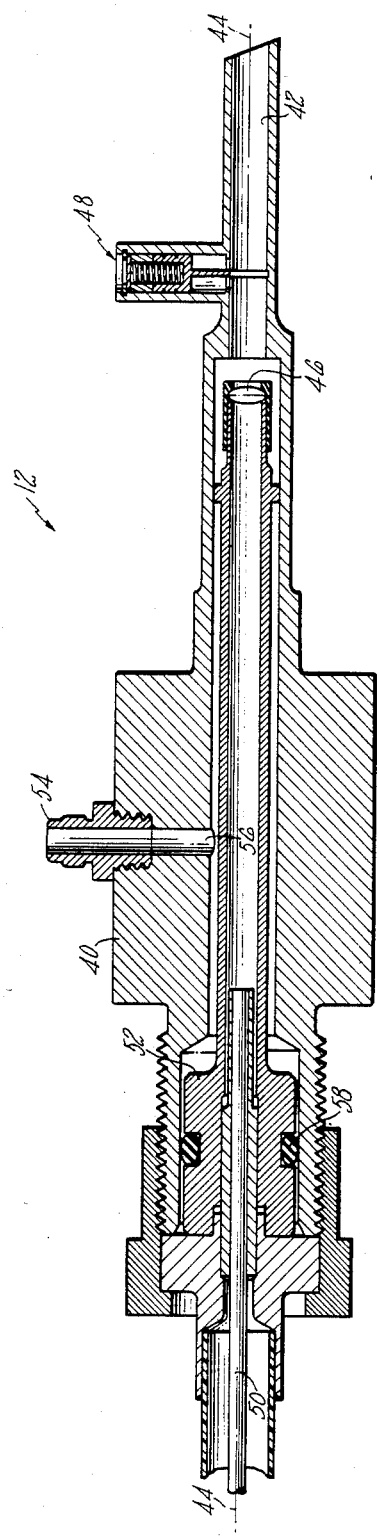
FIG. 2 is a sectioned illustration of an optical probe used in the dual spectra optical pyrometer of FIG. 1.

FIG. 2 is a sectioned illustration of a portion of optical probe 12 used in the dual spectra optical pyrometer of FIG. 1. The probe includes a sight tube 40 which is conventionally fitted into casing (14, FIG. 1) of the jet engine. For example, the probe for a typical jet engine is made from stainless steel, and is located on the suction side of the first turbine. The sight tube possesses an inner bore 42 having a longitudinal axis 44 in which ordinary light gathering optics such as sapphire lens 46 are fixed.

In the best mode embodiment, the spot size of the turbine blade optical beam is approximately 0.200 inches and is positioned approximately 3.5 inches from the turbine blade mandating an inner bore diameter greater than 0.442 inches. As described hereinafter with respect to FIG. 3, an optical shutter 48 is positioned within the inner bore that receives the turbine blade optical beam and is responsive to the air pressure within the jet engine. Additionally, apparatus for preventing internal reflections such as a conventional helical spring or aperture may be included in the inner bore.

The turbine blade optical beam is provided to optical fiber 50 located within the bore by a conventional retainer 52 which includes means for locating the optical fiber along the bore longitudinal axis. The optical fiber or fused fiber optic bundle should be selected to receive all the energy of the focused turbine blade optical beam. The probe also includes fitting 54 for receiving purge gas from an external source. The gas is provided to the probe inner bore by an appropriate aperture 56 in the sight tube. The probe is sealed by a conventional O-ring 58. Not shown in FIG. 2 are adaptations to the sight tube for mounting in the jet engine which are conventional and vary with engine type.

Figure 3:
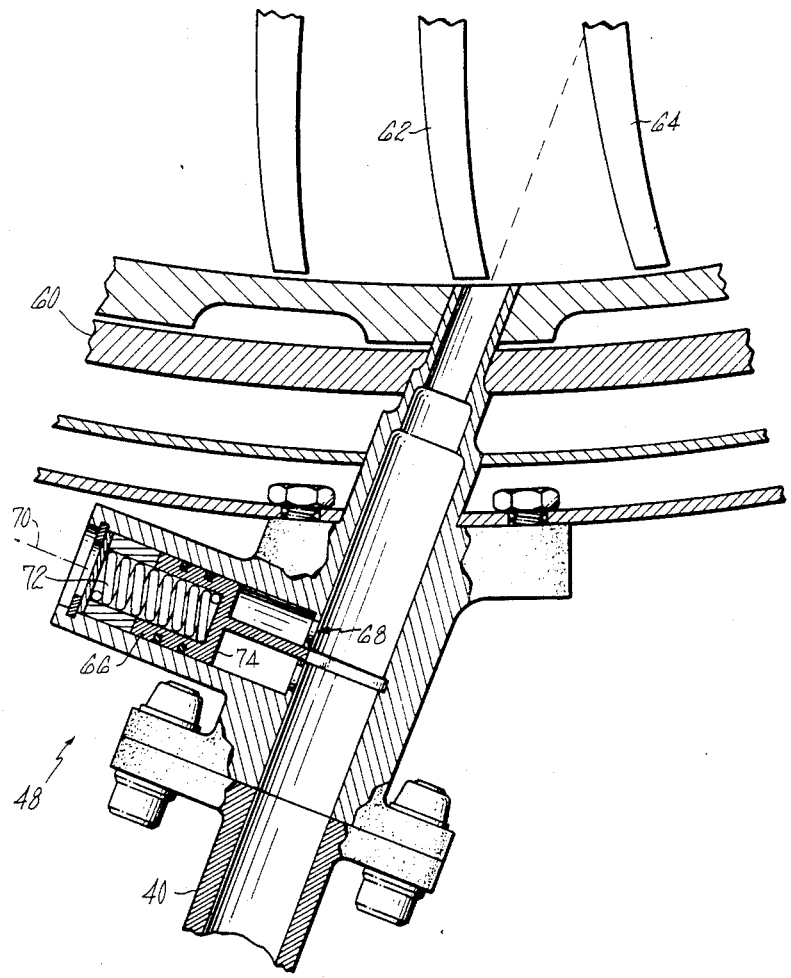
FIG. 3 is a sectioned illustration of an air pressure sensitive shutter provided according to the present invention.

FIG. 3 is a sectioned illustration of a portion of air pressure sensitive shutter 48 provided according to the present invention. The shutter comprises part of the optical probe which is mounted to jet engine casing 60. The shutter is positioned within the sight tube inner bore to be responsive to the air pressure within the jet engine and to receive the turbine blade optical beam from turbine blades 62 and 64 as they rotate.

The shutter operates to seal the light gathering optics and optical fiber within the inner bore until the air pressure within the jet engine exceeds a preselected threshold magnitude. The shutter remains open as long as that threshold is exceeded. For example, with a typical jet engine the shutter threshold is set at approximately 50 lbs. When the engine air pressure drops below this magnitude the shutter closes.

In the best mode embodiment the shutter comprises a movable piston 66 positioned in sight tube outer recess 68 about an axis 70 perpendicular to the inner bore longitudinal axis. Spring 72 is of a conventional helical type and is positioned behind the movable piston exerting a force parallel to the piston axis.

The air pressure within the shutter housing exerts a force perpendicular to the surfaces contained within. The air pressure will exert a force on piston surface 74 that is parallel to the piston axis, and opposing the restoring force of the spring. The magnitude of the force will be a function of the surface area as well as the air pressure.

As the air pressure increases, the force exerted on the pistons will increase such that beyond a certain magnitude the air pressure force will exceed the spring restoring force, thereby moving the piston away from the sight tube longitudinal axis, allowing the turbine blade optical beam to pass. The magnitude of the restoring force is well known to be a function of the spring parameters (coil diameter, coil thickness, etc.), and should be selected in conjunction with piston surface area engine air pressure.

Those skilled in the art will note that other shutter configurations including opposing pistons with wedge or parabolic cross section geometries may be equivalently substituted. Moreover, other equivalent restoring means such as an electrical solenoid may be substituted for the spring.

In the best mode embodiment purge gas is provided in selective quantities to the sight tube to activate the shutter as well as cool the probe components and further reduce contamination. In in-flight applications such purged gas is bled from the jet engine compressor by conventional techniques.

Similarly, although the invention has been shown and described with respect to a best mode embodiment thereof, it should be understood by those skilled in the art that various other changes, omissions and additions thereto may be made therein without departing from the spirit and scope of the invention.

I claim:

1. An air pressure sensitive shutter for use in sealing optical components of an optical pyrometer in a jet engine, comprising:

sight tube means located in the jet engine having an inner bore, said inner bore adapted to receive an optical beam from a turbine blade of the jet engine and responsive to air pressure generated therein, said sight tube means positioning the optical components in said inner bore, shutter means responsive to said jet engine air pressure, positioned in said sight tube means and providing said turbine blade optical beam to said optical components only above a selected threshold magnitude of said air pressure.

2. The pressure sensitive shutter of claim 1, wherein said shutter means further comprises a movable piston positioned in said sight tube means, includes restoring means for providing to said piston a restoring force having a maximum magnitude selected to be less than said threshold air pressure magnitude, alternately opening and closing said piston in response to said air pressure.

3. The air pressure sensitive shutter of claim 2, wherein said restoring means comprises a spring.

4. A dual spectra optical pyrometer having an air pressure sensitive shutter for measuring the temperature of a remote turbine blade in a jet engine, comprising:

sight tube means having an inner bore located in the jet engine gathering from the turbine blade an optical beam having a spectral width and having an emitted component from the turbine blade and a reflected component from a fireball having an equivalent black body temperature, said sight tube means responsive to air pressure generated in the jet engine, and further positioning an optical guide means therein;

shutter means responsive to said jet engine air pressure positioned in said sight tube means for providing said turbine blade optical beam to said optical guide means only above a threshold magnitude of said air pressure;

optical detection module means adapted to receive said optical guide means for dividing said turbine blade optical beam and providing first electrical signals equivalent of a first optical component of said turbine blade optical beam having a spectral width selected to be a portion of said turbine blade optical beam, said detection module means further providing second electrical signals equivalent of a second optical beam; and signal processing means receiving said first and second electrical signals and further receiving signals indicative of said first component spectral width and an estimate of said fireball equivalent black body temperature, said signal processor means generating from said first electrical signals a linearized temperature signal indicative of an equivalent black body temperature, generating from said second electrical signals a linearized temperature signal indicative of an equivalent black body temperature, generating from the difference between said first and second linearized temperature signals a temperature correction signal in dependence on said estimated fireball equivalent black body temperature signal and said first component spectral width signal, providing a compensated temperature signal from the difference between said first temperature signal and said temperature correction signal.

5. The dual spectra optical pyrometer of claim 4, wherein said shutter means further comprises a movable piston positioned in said sight tube means, said shutter means further including restoring means for providing said piston a restoring force having a maximum magnitude selected to be less than said threshold air pressure magnitude, alternately opening and closing said piston means in response to said air pressure.

6. The dual spectra optical pyrometer of claim 4, wherein said restoring means comprises a spring.

* * * * *